United States Patent
Kumamoto et al.

(10) Patent No.: US 7,265,741 B2
(45) Date of Patent: Sep. 4, 2007

(54) DISPLAY APPARATUS AND DISPLAY APPARATUS DRIVE METHOD

(75) Inventors: Yasuhiro Kumamoto, Neyagawa (JP); Taro Funamoto, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 442 days.

(21) Appl. No.: 10/474,497

(22) PCT Filed: Jan. 20, 2003

(86) PCT No.: PCT/JP03/00397

§ 371 (c)(1),
(2), (4) Date: Oct. 9, 2003

(87) PCT Pub. No.: WO03/063121

PCT Pub. Date: Jul. 31, 2003

(65) Prior Publication Data

US 2004/0141094 A1    Jul. 22, 2004

(30) Foreign Application Priority Data

Jan. 21, 2002  (JP) ............................. 2002-011350

(51) Int. Cl.
*G09G 3/36* (2006.01)
(52) U.S. Cl. .................... 345/99; 345/554; 348/563; 348/569; 348/792
(58) Field of Classification Search ............... 345/99, 345/554; 348/698, 792, 563–564, 569–570
See application file for complete search history.

(56) References Cited

U.S. PATENT DOCUMENTS 5,737,029 A * 4/1998 Ohkura et al. ............... 725/56
5,850,209 A * 12/1998 Lemke et al. ................ 345/156
5,933,130 A * 8/1999 Wagner ........................ 345/690
6,753,835 B1 * 6/2004 Sakai ............................ 345/87

(Continued)

FOREIGN PATENT DOCUMENTS

CN    1279459    1/2001

(Continued)

OTHER PUBLICATIONS

Taiichiro Kurita, "Picture Quality of Hold Type Display for Moving Images", Technical Report of IEICE EID99-10 (Jun. 1999), pp. 55-60, and its partial translation.

*Primary Examiner*—Amr A. Awad
*Assistant Examiner*—Michael Pervan
(74) *Attorney, Agent, or Firm*—Wenderoth, Lind & Ponack, L.L.P.

(57) ABSTRACT

An EPG extraction portion extracts EPG information; a program type decision portion decides the type of broadcast program using the extracted EPG information, and outputs a ratio modification signal to change the ratio of the image display interval to the black display interval according to the program type; a driving pulse generation portion generates a gate driver control signal which changes the write timing of a frequency-doubled image signal and frequency-doubled black display signal in one field interval, according to the ratio modification signal; and, a gate driver changes the write timing of the frequency-doubled image signal and frequency-doubled black display signal according to the gate driver control signal, to change the ratio of the image display interval to the black display interval.

12 Claims, 9 Drawing Sheets

U.S. PATENT DOCUMENTS

| | | | |
|---|---|---|---|
| 6,937,224 B1 | 8/2005 | Miyachi | |
| 2001/0003448 A1 | 6/2001 | Nose | |
| 2002/0003522 A1* | 1/2002 | Baba et al. | 345/89 |
| 2002/0149549 A1* | 10/2002 | Ohta et al. | 345/87 |
| 2004/0246242 A1* | 12/2004 | Sasaki | 345/204 |

FOREIGN PATENT DOCUMENTS

| | | |
|---|---|---|
| JP | 10-108086 | 4/1998 |
| JP | 10-301535 | 11/1998 |
| JP | 11-109921 | 4/1999 |
| JP | 2000-105575 | 4/2000 |
| JP | 2001-42831 | 2/2001 |
| JP | 2001-184034 | 7/2001 |
| JP | 2001-251567 | 9/2001 |
| JP | 2002-31790 | 1/2002 |

* cited by examiner

DISPLAY APPARATUS AND DISPLAY APPARATUS DRIVE METHOD

TECHNICAL FIELD

This invention relates to a hold-type display device which continues display of an image for a prescribed display interval, and a driving method for such a display device.

BACKGROUND ART

Conventionally, liquid crystal display devices have frequently been used as computer display devices by virtue of their light weight, thin shape, low power consumption, and other advantages, but as screen sizes have grown, there has been a gradual increase in the cases of use as television sets. Because these liquid crystal display devices are hold-type display devices in which display of an image is continued for one frame interval, there is occurrence of motion blurring phenomena (hereafter called "edge blur"), in which the outlines of images are blurred during video display, and so video display performance comparable to that of the CRTs (cathode-ray tubes) generally used in television sets is not obtained.

Numerous research reports have been published concerning the principle of occurrence of the above edge blur (for example, see Taishiro Kurita, "Hold gata Display ni okeru Douga Hyouji no Gashitsu" (Picture Quality of Movie Display in a Hold-type Display), IEICE Tech. Rep., EID99-10, 1999, pp. 55-60), and as a liquid crystal display device in which edge blur is improved, there is a display in which frequency-doubled image signals and black display signals are written periodically within one field interval (see for example Japanese Patent Laid-open No. 2002-31790).

FIG. 8 is a block diagram showing the configuration of a conventional liquid crystal display device. The liquid crystal display device shown in FIG. 8 comprises a signal conversion portion 101, driving pulse generation portion 102, source driver 103, gate driver 104, and liquid crystal panel 105. The signal conversion portion 101 frequency-doubles the input image signal for each line, using an input synchronization signal as reference, converts the image signal into a frequency-doubled signal consisting of a frequency-doubled image signal and frequency-doubled black display signal, and outputs the frequency-doubled signal to the source driver 103. The driving pulse generation portion 102 outputs a source driver control signal and gate driver control signal, with the input synchronization signal as reference, to control the source driver 103 and gate driver 104. The source driver 103 applies the voltage to be applied to individual pixels within the liquid crystal panel 105 to the source lines SL1 to SL10. The gate driver 104 applies, to the gate lines GL1 to GL10, a voltage to set each of the pixels in the liquid crystal panel 105 to the on state or the off state. At this time, each of the gate lines GL1 to GL10 of the liquid crystal panel 105 is selected twice within one field interval, and an image signal and black display signal are written once each to the pixels on each of the gate lines GL1 to GL10. Hence black insertion driving, in which a black display signal is written periodically while writing image signals, can be realized.

FIG. 9 is a drawing showing the change with time in pixel brightness in the conventional liquid crystal display device of FIG. 8. As shown in FIG. 9, one field interval consists of an image display interval T1 and a black display interval T2, and a given pixel is driven as illustrated so that black is periodically displayed. In this case, the driving method in the liquid crystal display device is pseudo-impulse driving (hereafter called "pseudo-impulse driving"), and the edge blur which occurs in video display can be improved.

However, although edge blur can be improved through pseudo-impulse driving in the above-described liquid crystal display device, each field interval comprises a black display interval, so that the average brightness is decreased. The longer the black display interval is made in order to improve edge blur, the more pronounced is this tendency, so that brightness is decreased and satisfactory video display is not possible.

Further, because the amount of motion of an image in the display of video changes variously according to the type of video, the required black display interval length also changes variously. Hence when a black display interval appropriate to an image having an average motion amount is set, edge blur can be reduced sufficiently for images with a small amount of motion, but the brightness is reduced unnecessarily, and satisfactory video display is not possible.

Further, when using a TN (Twisted Nematic) mode in the above-described liquid crystal display device, the driving response time is slow at approximately 16 ms, so that even if a black display interval is set, edge blur may remain due to the slowness of the driving response of the liquid crystal panel.

DISCLOSURE OF THE INVENTION

An object of this invention is the provision of a display device and a driving method for the display device which enables improvement of edge blur, while also enabling suppression of the decrease in brightness.

A display device according to one aspect of the invention is a hold-type display device which continues display of an image during a prescribed display interval, comprising conversion means which converts an input image signal into a high-frequency signal consisting of a high-frequency image signal obtained by increasing the frequency of the above signal and a black display signal for the display of black; generation means which generates a timing signal to change the write timing in a prescribed interval of the high-frequency image signal and the black display signal, in order to modify the ratio within the prescribed interval of the interval for image display by the high-frequency image signal and the interval for black display by the black display signal; and, display means which modifies the write timing of high-frequency image signals and black display signals of the high-frequency signals converted by the conversion means according to the timing signal generated by the generation means, and displays the image.

By means of this configuration, an input image signal is converted into a high-frequency signal comprising a high-frequency image signal obtained by increasing the frequency of the image signal, and a black display signal to display black; a timing signal is generated to change the write timing of the high-frequency image signal and the black display signal during a prescribed interval, in order to change the ratio of the image display interval by the high-frequency image signal to the black display interval by the black display signal in the prescribed interval; the write timing of the high-frequency image signal and black display signal of the high-frequency signal is changed according to the timing signal thus generated; and, an image is displayed using this ratio of the image display interval to the black display interval corresponding to the write timing.

Hence the ratio of the image display interval to the black display interval in display of images can be changed, so that when displaying video with large amounts of motion, the black display interval can be lengthened to sufficiently reduce edge blur, and when displaying video with small amounts of motion the black display interval can be shortened to secure sufficient brightness; consequently edge blur can be improved, and in addition the reduction of brightness can be suppressed.

It is preferable that a display device comprise reception means which receives television broadcast signals, including electronic program guide information; extraction means, which extracts electronic program guide information from television broadcast signals received by the reception means; and, decision means, which decides the type of broadcast program from the electronic program guide information extracted by the extraction means, and which outputs a ratio modification signal to change the ratio of the image display interval by the high-frequency image signal to the black display interval by the black display signal according to the broadcast program type decided in this way; further, it is preferable that the generation means comprise generation means for programs, which generates a timing signal according to the ratio modification signal output from the decision means.

In this case, a television broadcast signal, containing electronic program guide information, is received; the electronic program guide information is extracted from the received television broadcast signal; the type of broadcast program is decided from the extracted electronic program guide information; a ratio modification signal is output, in order to change the ratio of the image display interval by the high-frequency image signal to the black display interval by the black display signal, according to the type of broadcast program thus decided; and a timing signal is generated to change the write timing of the high-frequency image signal and black display signal in the prescribed interval, according to the ratio modification signal. Hence the write timing of the high-frequency image signal and black display signal of the high-frequency signal is changed according to the timing signal thus generated, and the image is displayed at a ratio of the image display interval to the black display interval which corresponds to this write timing. As a result, a black display interval appropriate to the type of broadcast program is automatically set, so that edge blur can be improved according to the broadcast program type, and in addition the reduction in brightness can be suppressed to the minimum necessary amount.

It is preferable that, when the decision means decides that the broadcast program is of a first type, a first ratio modification signal be output to the generation means for programs in order to set the black display interval to a first black display interval; when the decision means decides that the broadcast program is of a second type, in which images are mainly displayed with motion amounts smaller than for the first type, a second ratio modification signal be output to the generation means for programs, in order to set the black display interval to a second black display interval which is shorter than the first black display interval; the generation means for programs generate a first timing signal which sets the black display interval to the first black display interval in response to the first ratio modification signal when the first ratio modification signal is input, and when the second ratio modification signal is input; and, when the second ratio modification signal is input, the generation means for programs generate a second timing signal which sets the black display interval to the second black display interval, in response to the second ratio modification signal.

In this case, when it is decided that the type of a broadcast program is the first type, the first ratio modification signal is output in order to set the black display interval to the first black display interval, the first timing signal is generated to set the black display interval to the first black display interval in response to the first ratio modification signal, and the image is displayed using the first black display interval, in response to the first timing signal. On the other hand, when the type of a broadcast program is decided to be the second type, in which images are mainly displayed with motion amounts smaller than for the first type, the second ratio modification signal is output in order to set the black display interval to the second black display interval, which is shorter than the first black display interval, the second timing signal is generated to set the black display interval to the second black display interval in response to the second ratio modification signal, and the image is displayed using the second black display interval, in response to the second timing signal.

Hence when the type of a broadcast program is decided to be the first type, in which images are mainly displayed with motion amounts larger than for the second type, the black display interval is lengthened so that edge blur can be improved sufficiently; and, when the type of a broadcast program is decided to be the second type, in which images are mainly displayed with motion amounts smaller than for the first type, the black display interval is shortened so that edge blur can be improved sufficiently, while increasing brightness and suppressing the decrease in brightness to the minimum necessary amount.

It is preferable that a display device further comprise operation means which accepts user operations and outputs a ratio modification signal to change the ratio between the image display interval by the high-frequency image signal and the black display interval by the black display signal, in response to the user operations, and that the generation means comprise generation means for the user, which generates a timing signal in response to a ratio modification signal output from the operation means.

In this case, a ratio modification signal is output in order to change the ratio of the image display interval by the high-frequency image signal to the black display interval by the black display signal, in response to user operations, and a timing signal is generated in order to change the write timing of the high-frequency image signal and black display signal within the prescribed interval in response to this ratio modification signal. Hence the write timing of the high-frequency image signal and black display signal of the high-frequency signal is changed in response to the timing signal thus generated, and an image is displayed using a ratio of the image display interval to the black display interval corresponding to this write timing. As a result, the black display interval can be set in response to user operations, so that edge blur can be improved according to user wishes, and in addition reductions in brightness can be suppressed to the minimum necessary amount.

It is preferable that a display device further comprise power supply means, which supplies electrical power provided from outside to the device unit; an internal battery, which is detachably attached to the device unit and which supplies electrical power to the device unit which power is not supplied to the device unit by the power supply means; and, judgment means which judges the power supply state of the power supply means and outputs a ratio modification signal in order to change the ratio of the image display interval by the high-frequency image signal to the black display interval by the black display signal; and, it is preferable that the generation means comprise generation means for power, which generates a timing signal in response to a ratio modification signal output from the judgment means.

In this case, the power supply state of the power supply means is judged; in response to this judgment result, a ratio modification signal is output in order to change the ratio of the image display interval by the high-frequency image signal to the black display interval by the black display signal; and, in response to this ratio modification signal, a timing signal is generated in order to change the write timing of the high-frequency image signal and black display signal within the prescribed interval. Hence the writing timing of the high-frequency image signal and black display signal of the high-frequency signal is changed in response to the timing signal thus generated, and an image is displayed at a ratio of the image display interval to the black display interval corresponding to this write timing. As a result, when power is supplied from the power supply means, the black display interval can be lengthened and edge blur improved, and when power from the internal battery is being supplied the black display interval can be shortened and the brightness increased, in order to suppress consumption of the internal battery; consequently edge blur can be improved according to the state of supply of power by the power supply means, and the internal battery can be utilized effectively.

It is preferable that the display means further comprise light-emission means which emits light for display, and brightness control means which controls the brightness of the light-emission means; that, when the judgment means judges that power is being supplied from the power supply means, a first ratio modification signal be output to the generation means for power in order to set the black display interval to the first black display interval, and in addition a first brightness control signal to set the brightness of the light-emission means to a first brightness level be output to the brightness control means, whereas when the judgment means judges that power is being supplied from the internal battery, a second ratio modification signal to set the black display interval to the second black display interval which is shorter than the first black display interval be output to the generation means for power, and in addition a second brightness control signal to set the brightness of the light-emission means to a second brightness level lower than the first brightness level be output to the brightness control means; that, when the first ratio modification signal is input, the generation means for power generate a first timing signal to set the black display interval to the first black display interval in response to the first ratio modification signal, and when the second ratio modification signal is input, the generation means for power generates a second timing signal to set the black display interval to the second black display interval in response to the second ratio modification signal; and that, when the first brightness control signal is input, the brightness control means sets the brightness of the light-emission means to a first brightness level in response to the first brightness control signal, and when the second brightness control signal is input, the brightness control means sets the brightness of the light-emission means to a second brightness level in response to the second brightness control signal.

In this case, when power is supplied from the power supply means, the first brightness control signal is output in order to set the brightness of the light-emitting means to the first brightness level and the brightness of the light-emitting means is set to the first brightness level in response to the first brightness control signal, while the first ratio modification signal is output in order to set the black display interval to the first black display interval, the first timing signal is generated to set the black display interval to the first black display interval in response to the first ratio modification signal, and the image is displayed using the first black display interval in response to the first timing signal. On the other hand, when power is supplied from the battery, the second brightness control signal is output in order to set the brightness of the light-emitting means to the second brightness level lower than the first brightness level, and the brightness of the light-emitting means is set to the second brightness level in response to the second brightness control signal, while in addition the second ratio modification signal is output in order to set the black display interval to the second black display interval shorter than the first black display interval, the second timing signal is generated to set the black display interval to the second black display interval in response to the second ratio modification signal, and the image is displayed using the second black display interval in response to the second timing signal.

Hence when power is supplied from the power supply means, the black display interval is lengthened and edge blur is improved sufficiently, while also increasing the brightness of the light-emitting means to enable satisfactory display of video; and, when power is supplied from the internal battery, the black display interval is shortened to increase the display brightness, and at the same time the brightness of the light-emitting means can be reduced to suppress consumption of the internal battery.

It is preferable that the conversion means convert the image signal into a frequency-doubled signal, consisting of a frequency-doubled double-frequency image signal and a frequency-doubled black display signal for the display of black. In this case, the prescribed interval can be divided in two and either the frequency-doubled image signal or the frequency-doubled black display signal written, so that both the image signal and the black display signal can be written stably, and the desired black display interval can be set accurately.

It is preferable that the display means comprise a plurality of source lines, to which pixel signals are supplied, a plurality of gate lines, to which scan signals are supplied, and a plurality of pixel cells, positioned in matrix form at the intersections of source lines and gate lines. In this case, it is possible to sufficiently improve edge blur in a liquid crystal display device in which edge blur tends to occur, and in addition the reduction in brightness can be suppressed to the minimum necessary amount.

It is preferable that pixel cells are OCB (optically self-compensated birefringence) cells. In this case, an OCB mode with a fast driving response time can be employed for video display, so that edge blur can be further improved.

A display device driving method according to another aspect of the invention is a hold-type display device driving method which continues display of an image during a prescribed display interval, comprising a conversion step, in which an input image signal is converted into a high-frequency signal consisting of a high-frequency image signal obtained by increasing the frequency of the above signal and a black display signal for the display of black; a generation step, in which a timing signal is generated to change the write timing in a prescribed interval of the high-frequency image signal and the black display signal, in order to modify the ratio within the prescribed interval of the interval for image display by the high-frequency image signal and the interval for black display by the black display signal; and, a display step, in which the write timing of high-frequency image signals and black display signals of the high-frequency signals converted in the conversion step according to the timing signal generated in the generation step is modified, and the image is displayed.

By means of this configuration, an input image signal is converted into a high-frequency signal comprising a high-frequency image signal obtained by increasing the frequency of the image signal, and a black display signal to display black; a timing signal is generated to change the write timing of the high-frequency image signal and the black display signal during a prescribed interval, in order to change the ratio of the image display interval by the high-frequency image signal to the black display interval by the black display signal in the prescribed interval; the write timing of the high-frequency image signal and black display signal of the high-frequency signal is changed according to the timing signal thus generated; and, an image is displayed using this ratio of the image display interval to the black display interval corresponding to the write timing.

Hence the ratio of the image display interval to the black display interval in display of images can be changed, so that when displaying video with large amounts of motion, the black display interval can be lengthened to sufficiently reduce edge blur, and when displaying video with small amounts of motion the black display interval can be shortened to secure sufficient brightness; consequently edge blur can be improved, and in addition the reduction of brightness can be suppressed.

BEST MODE FOR CARRYING OUT THE INVENTION

Figure 1:
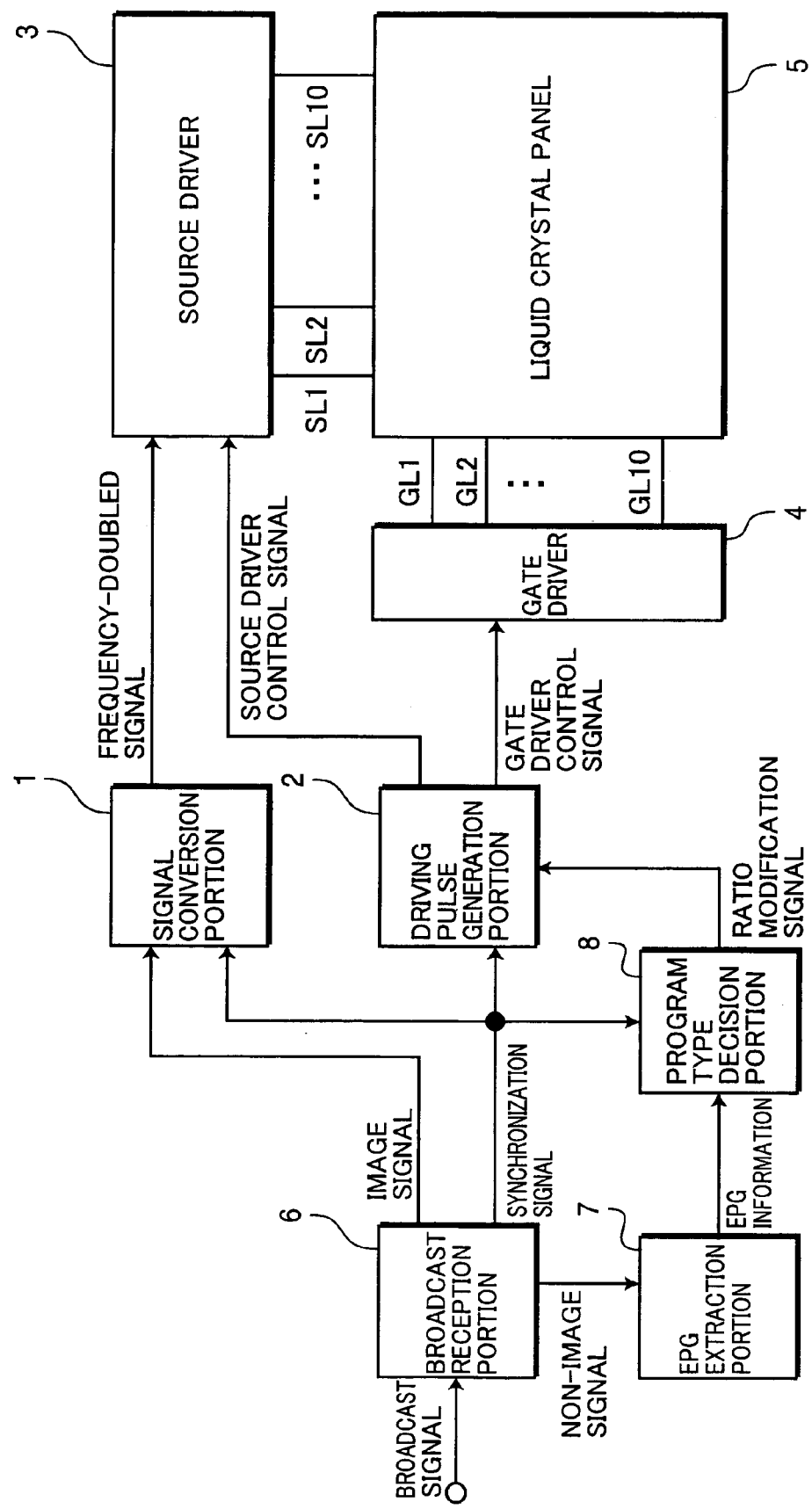
FIG. 1 is a block diagram showing the configuration of the display device of a first aspect of the invention.

Below, display devices of different aspects of the invention are explained, referring to the drawings. FIG. 1 is a block diagram showing the configuration of the display device of a first aspect of the invention. In FIG. 1, to simplify the drawing, the number of source lines and the number of gate lines are each shown to be 10, but the number of source lines and the number of gate lines are not limited to this number, and can be changed variously.

The liquid crystal display device shown in FIG. 1 comprises a signal conversion portion 1, driving pulse generation portion 2, source driver 3, gate driver 4, liquid crystal panel 5, broadcast reception portion 6, EPG (electronic program guide) extraction portion 7, and program type decision portion 8.

The broadcast reception portion 6 receives broadcast signals and separates the broadcast signals into image signals, synchronization signals, and non-image signals, and outputs the image signals and synchronization signals to the signal conversion portion 1, the synchronization signals to the driving pulse generation portion 2 and program type decision portion 8, and the non-image signals to the EPG extraction portion 7.

The EPG extraction portion 7 extracts EPG information from the non-image signal output from the broadcast reception portion 6, and stores the extracted EPG information, while also outputting the EPG information to the program type decision portion 8. The program type decision portion 8 uses the EPG information output from the EPG extraction portion 7 to decide the type of broadcast program displayed on the liquid crystal panel 5, and using the synchronization signal output from the broadcast reception portion 6 as reference, outputs to the driving pulse generation portion 2 a ratio modification signal in order to change the ratio of the image display interval to the black display interval, according to the program type decision.

Here, as broadcast program types, for example news and reports, sports, education and information, drama, music, variety, movies, animation and special effects, and other genres are stipulated in advance in EPG information; in addition, subgenres are stipulated in advance in the sports, education and information, movies, and other genres. Ratios of image display intervals to black display intervals are set in advance for each of these genres, and the program type decision portion 8 outputs a ratio modification signal in order to change the ratio of the image display interval to the black display interval so as to become equal to the ratio appropriate to the genre.

The signal conversion portion 1 doubles the frequency of the image signal output from the broadcast reception portion 6 for each line using line memory, with the synchronization signal output from the broadcast reception portion 6 as reference, and in addition, by generating a frequency-doubled black display signal, converts the image signal into a high-frequency signal consisting of a frequency-doubled image signal and a frequency-doubled black display signal, and outputs the result to the source driver 3. The increase in frequency of the image signal by the signal conversion portion 1 is not limited to the above-described frequency doubling in particular, and another multiplication factor may be used.

The driving pulse generation portion 2 outputs to the gate driver 4 a gate driver control signal to control the gate driver 4, as a timing signal to change the write timing of the high-speed image signal and black display signal within one field interval so as to become equal to the ratio of the image display interval to the black display interval specified by the ratio modification signal output from the program type decision portion 8, with the synchronization signal output from the broadcast reception portion 6 as reference; in addition, the driving pulse generation portion 2 outputs to the source driver 3 a source driver control signal to drive the source driver 3.

Figure 2:
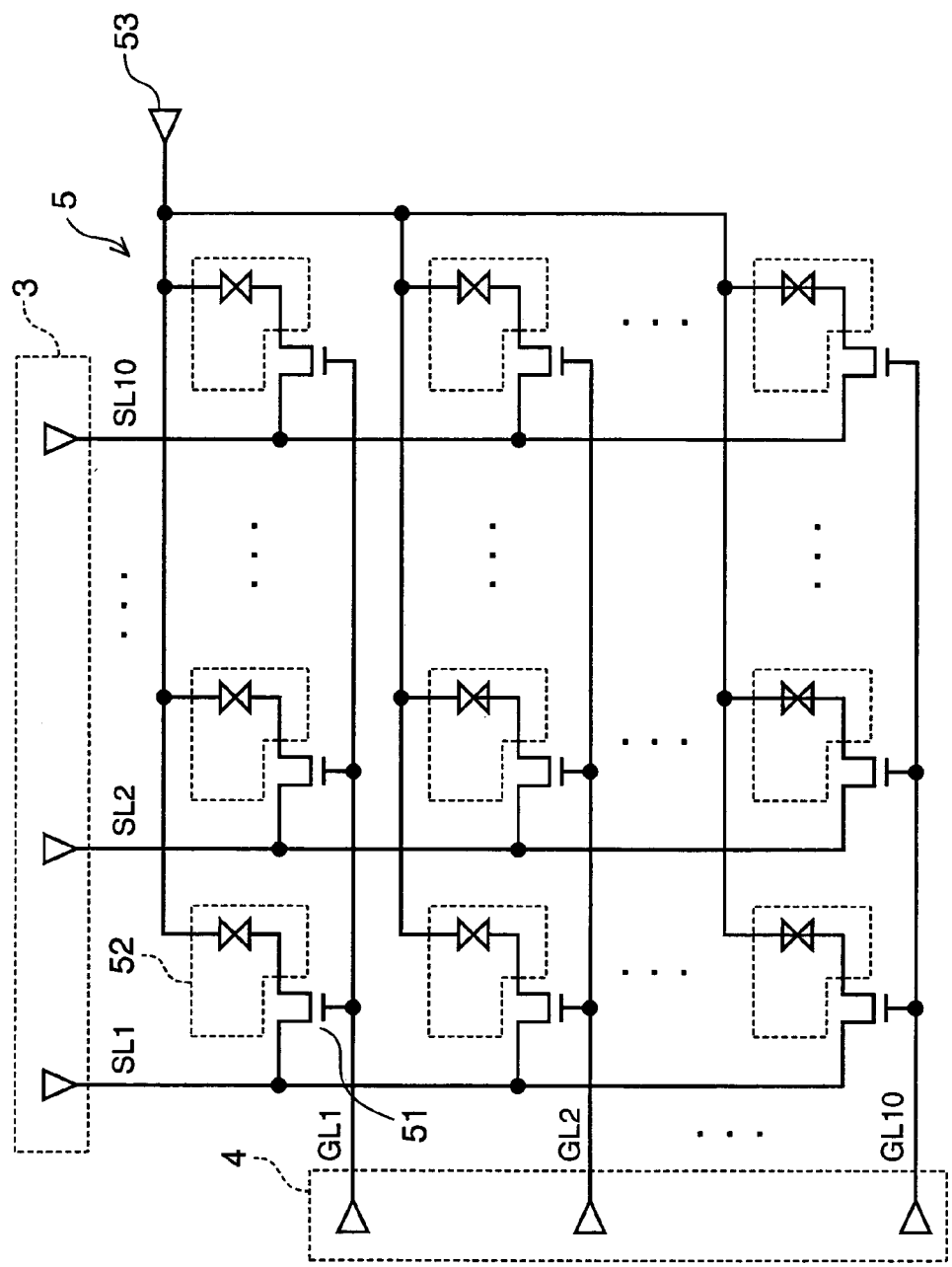
FIG. 2 is a circuit diagram showing the configuration of the liquid crystal panel shown in FIG. 1.

FIG. 2 is a circuit diagram showing the configuration of the liquid crystal panel 5 of FIG. 1. The liquid crystal panel 5 of FIG. 2 comprises a plurality of gate lines GL1 to GL10, a plurality of source lines SL1 to SL10, a plurality of thin film transistors (hereafter called "TFTs") 51 as switching elements, and a plurality of pixel cells 52. The plurality of pixels cells 52 are positioned in matrix form at the points of intersection of the plurality of source lines SL1 to SL10 and the plurality of gate lines GL1 to GL10; pixel signals from the source driver 3 are supplied to the plurality of source lines SL1 to SL10, and gate pulses serving as scan signals are supplied from the gate driver 4 to the plurality of gate lines GL1 to GL10.

The source driver 3 applies the voltage to be supplied to each pixel cell 52 to the source lines SL1 to SL10. The gate driver 4 applies a voltage to switch each of the TFTs 51 into the on-state or off-state to the gate lines GL1 to GL10. Specifically, the gate driver 4 applies in succession the on-voltage to the gate lines GL1 to GL10, synchronized with the supply of data to the source lines SL1 to SL10.

Figure 3:
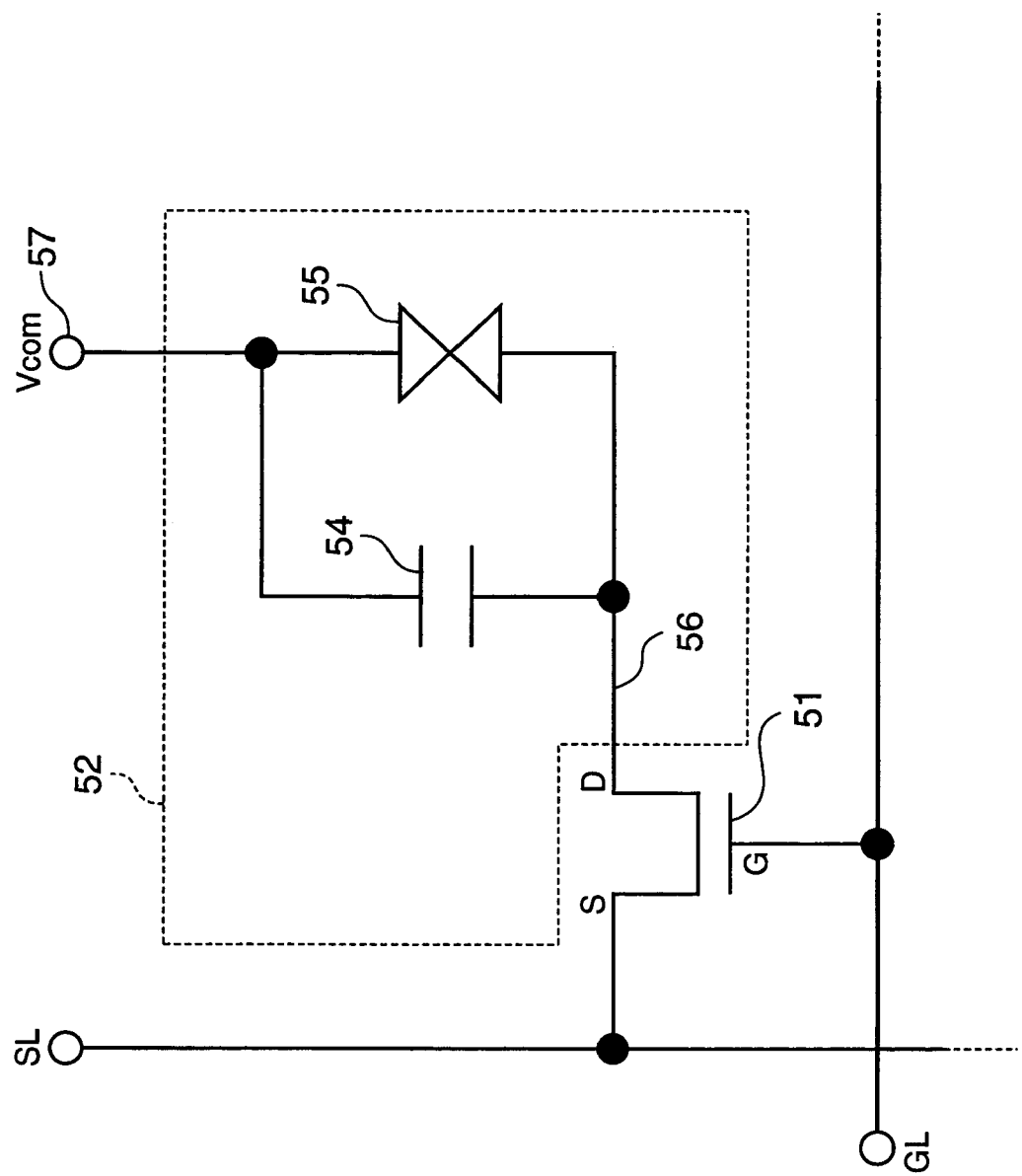
FIG. 3 is a circuit diagram showing the configuration of the pixel cells shown in FIG. 2.

FIG. 3 is a circuit diagram showing the configuration of the pixel cells 52 shown in FIG. 2. The pixel cell 52 shown in FIG. 3 comprises a holding capacitor 54, liquid crystals 55, pixel electrode 56, and opposing electrode 57. The pixel electrode 56 is connected to the drain electrode of the TFT 51. The pixel cell 52 comprises an OCB cell, and in OCB mode the liquid crystal panel 5 can be driven rapidly.

The holding capacitor 54 is formed between the pixel electrode 56 and the opposing electrode 57. The liquid crystals 55 are enclosed between and held by the pixel electrode 56 and opposing electrode 57. The opposing electrode 57 is driven by a voltage supplied from the opposed driving portion 53 shown in FIG. 2. The difference between the voltage applied to the opposing electrode 57 and the voltage supplied from the source line SL and applied to the pixel cell 52 becomes the voltage applied across the liquid crystals 55 within the pixel cell 52; this voltage determines the transmissivity of the pixel cell 52.

In this aspect, the signal conversion portion 1 is equivalent to one example of conversion means; the driving pulse generation portion 2 is equivalent to one example of the generation means and the generation means for programs; the source driver 3, gate driver 4 and liquid crystal panel 5 are equivalent to one example of display means; the broadcast reception portion 6 is equivalent to one example of reception means; the EPG extraction portion 7 is equivalent to one example of extraction means; and the program type decision portion 8 is equivalent to one example of decision means.

Through the above-described configuration, the program type decision portion 8 outputs a ratio modification signal to the driving pulse generation portion 2 in order to change the ratio of the image display interval to the black display interval so as to lengthen the black display interval when it is decided, using EPG information, that the broadcast program displayed on the liquid crystal panel 5 is a broadcast program with large amounts of motion, such as a sports program. The driving pulse generation portion 2 outputs a gate driver control signal to the gate driver 4 so as to change to the ratio of the image display interval to the black display interval specified by the ratio modification signal, and also outputs a source driver control signal to the source driver 3.

Figure 4:
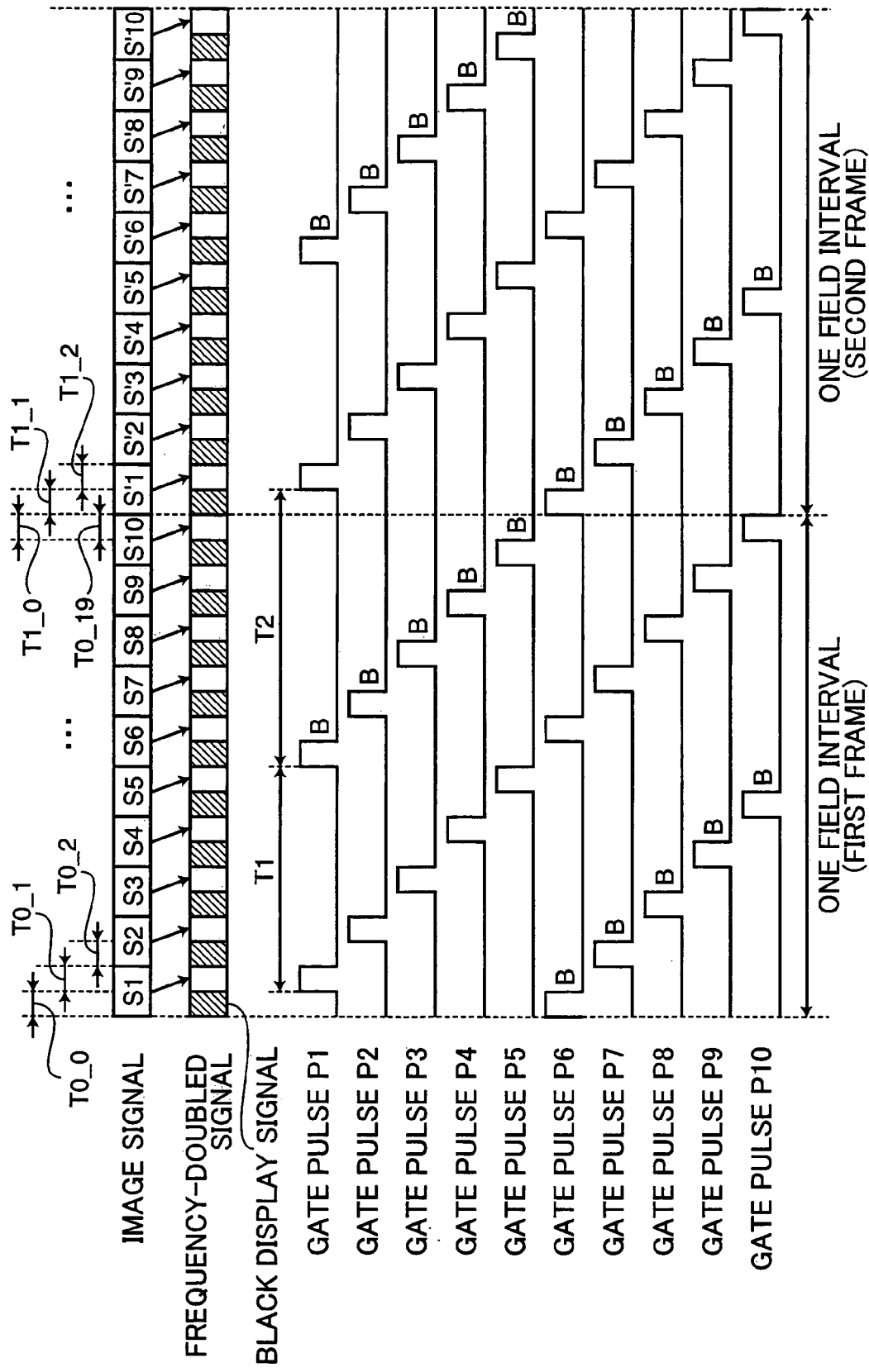
FIG. 4 is a timing chart showing an example of the image signal, frequency-doubled signal and gate pulse signal when displaying a sports program on the liquid crystal display device shown in FIG. 1.

FIG. 4 is a timing chart showing an example of the image signal, frequency-doubled signal and gate pulse signal when displaying a sports program on the liquid crystal display device shown in FIG. 1. In this aspect, a single-frame image is displayed in one field interval, so that in FIG. 4, the various signals are shown such that a single field interval, which is a single frame interval, comprises 10 horizontal intervals; but the number of horizontal intervals and other parameters are not particularly limited to those of this example, and various modifications are possible. This is similarly true for FIG. 5.

The gate pulses P1 to P10 shown in FIG. 4 are pulses which respectively select the ten gate lines GL1 to GL10 of the liquid crystal panel 5 during the high (HI) interval of each pulse. The gate pulses P1 to P10 are output from the gate driver 4 such that a prescribed interval is the HI interval according to the gate driver control signal which lengthens the black display interval, synchronized with the frequency-doubled signal input to the source driver 3.

That is, in the interval TO_1, the gate pulse P1 goes to HI, and the pixel signal S1 is written to the pixel cells on the gate line GL1. Next, in the interval TO_2, the gate pulse P7 goes to HI, and the back display signal B is written to the pixel cells on the gate line GL7. In interval TO_3, the gate pulse P2 goes to HI, and the pixel signal S2 is written to the pixel cells on the gate line GL2. Next, in interval TO_4 the gate pulse P8 goes to HI, and the black display signal B is written to the pixel cells on the gate line GL8. Similarly thereafter, image signals or black display signals are written to pixel cells with the timing of gate pulses.

In this way, each of the gate lines GL1 to GL10 of the liquid crystal panel 5 is selected twice within one field interval, and an image signal and a black display signal are written one time each to the pixel cells on each of the gate lines GL1 to GL10. Hence black insertion driving, in which a black display signal is written periodically while writing image signals, can be realized. As a result, in the example shown in FIG. 4, the ratio of the image display interval T1 to the black display interval T2 is set to 9:11, so that the black display interval T2 is longer, and edge blur in sports programs with greater amounts of motion can be reduced sufficiently.

On the other hand, when the program type decision portion 8 uses EPG information to decide that the broadcast program being displayed on the liquid crystal panel 5 is a broadcast program with a small amount of motion, such as for example a news program, a ratio modification signal is output to the driving pulse generation portion 2 to change the ratio of the image display interval to the black display interval such that the black display interval is shortened. The driving pulse generation portion 2 outputs a gate driver control signal to the gate driver 4 such that the ratio of the image display interval to the black display interval becomes as specified by the ratio modification signal, and also outputs a source driver control signal to the source driver 3.

Figure 5:
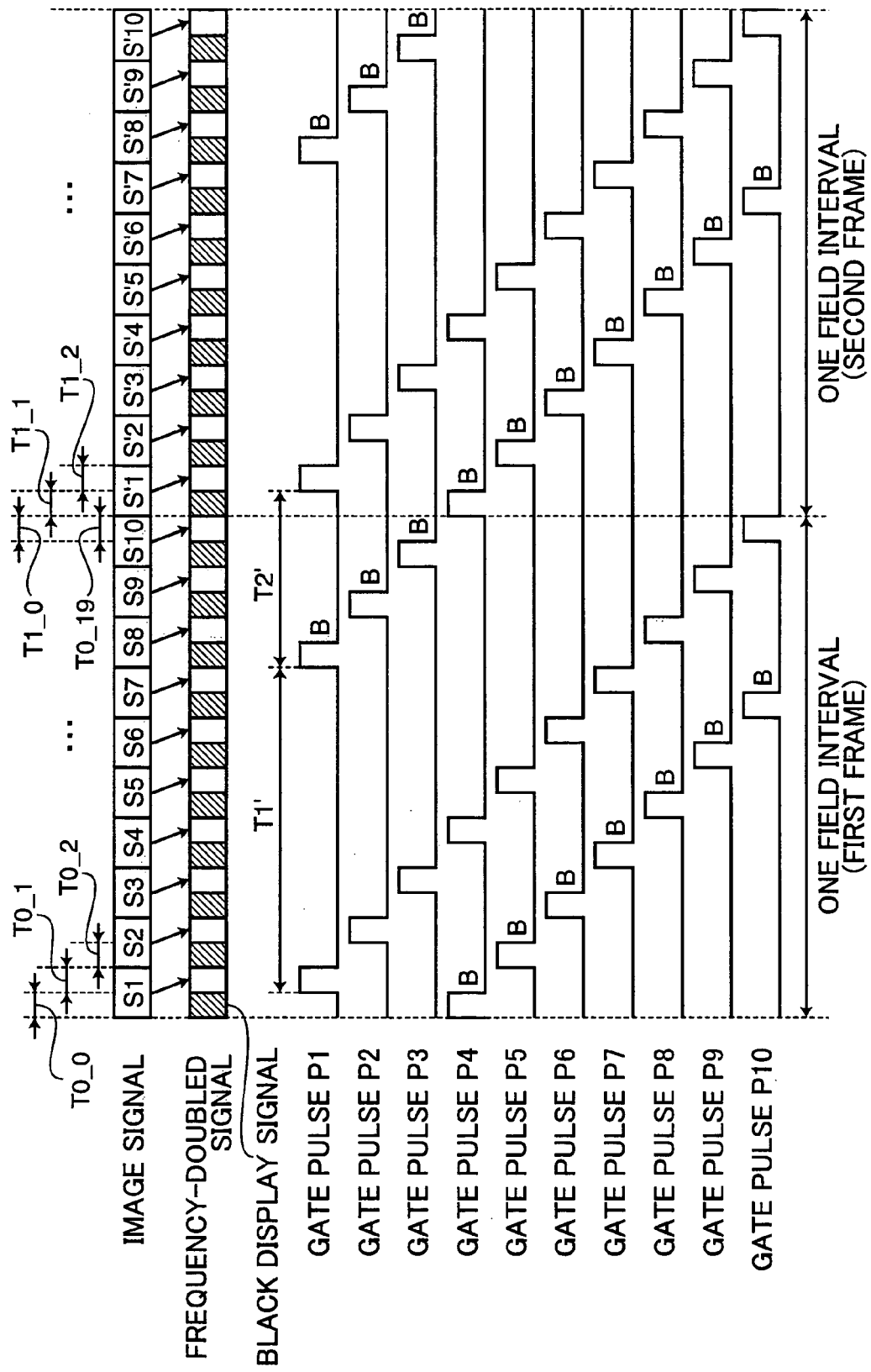
FIG. 5 is a timing chart showing an example of the image signal, frequency-doubled signal and gate pulse signal when displaying a news program on the liquid crystal display device shown in FIG. 1.

FIG. 5 is a timing chart showing an example of the image signal, frequency-doubled signal and gate pulse signal when displaying a news program on the liquid crystal display device shown in FIG. 1. The gate pulses P1 to P10 in FIG. 5 are output from the gate driver 4 such that a prescribed interval is a HI interval according to the gate driver control signal which shortens the black display interval, while maintaining synchronization with the frequency-doubled signal input to the source driver 3.

That is, in the interval TO_1, the gate pulse P1 goes to HI, and the image signal S1 is written to the pixel cells on the gate line GL1. Next, in the interval TO_2, the gate pulse P5 goes to HI, and the black display signal B is written to the pixel cells on the gate line GL5. In the interval TO_3, the gate pulse P2 goes to HI, and the image signal S2 is written to the pixel cells on the gate line GL2. Next, in the interval TO_4, the gate pulse P6 goes to HI, and the black display signal B is written to the pixel cells on the gate line GL6. Similarly thereafter, image signals and black display signals are written to pixel cells with the timing of gate pulses. As a result, in the example shown in FIG. 5, the ratio of the image display interval T1' to the black display interval T2' is set to 13:7, the black display interval T2' is shortened, and edge blur in news programs with small amounts of motion can be reduced sufficiently, while at the same time enabling high-brightness display.

As explained above, by changing the timing of the HI intervals activating writing of the black display signal in the gate pulses P1 to P10, the length of the black display interval which can be written in one field interval can be changed variously, and so the black display interval can be set to the optimal interval according to the type of broadcast program.

Thus in this aspect, EPG information is extracted from the television broadcast signal, the type of broadcast program is decided from the extracted EPG information, a ratio modification signal is output to change the ratio of the image display interval to the black display interval according to the type of broadcast program thus decided, and a gate driver control signal is generated which changes the write timing of the frequency-doubled image signal and the frequency-doubled black display signal in one field interval according to this ratio modification signal.

Hence the write timing is changed for the frequency-doubled image signal and the frequency-doubled black display signal according to the gate driver control signal thus generated, and the broadcast program is displayed at the ratio of the image display interval to the black display interval corresponding to this write timing. As a result, a black display interval appropriate to the type of broadcast program is automatically set, so that edge blur can be improved according to the type of broadcast program, and in addition reductions in brightness can be suppressed to the minimum necessary amount.

Figure 6:
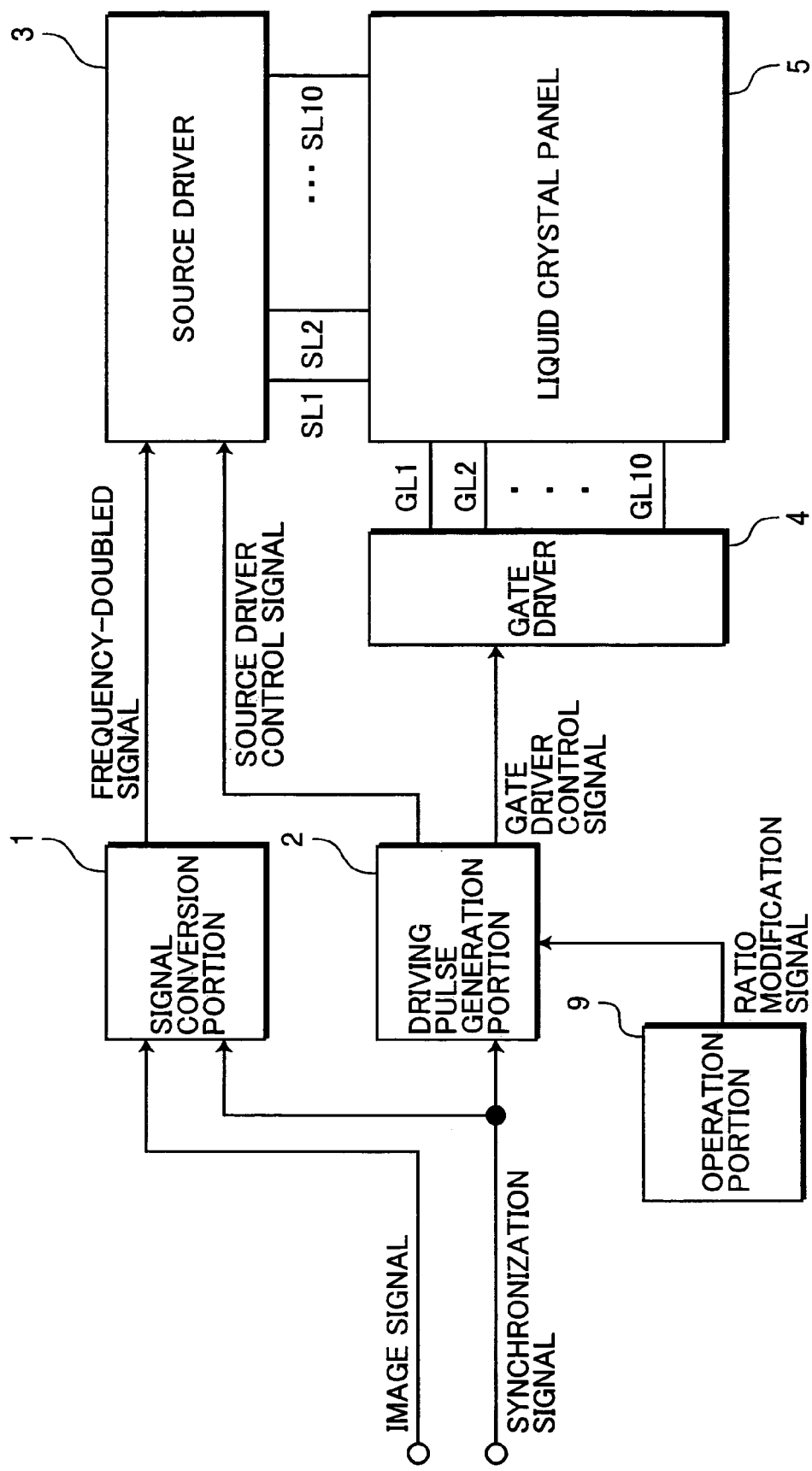
FIG. 6 is a block diagram showing the configuration of the display device of a second aspect of the invention.

Next, the display device of a second aspect of the invention is explained. FIG. 6 is a block diagram showing the configuration of the display device of the second aspect of the invention. A difference between the display device shown in FIG. 6 and the display device shown in FIG. 1 is the addition of an operation portion 9 in place of the EPG extraction portion 7 and program type decision portion 8; in other respects the configuration is similar to that of the display device shown in FIG. 1, and so the same portions are assigned the same symbols, and detailed explanations are omitted. In FIG. 6, the broadcast reception portion is omitted from the drawing, but the image signal and synchronization signal shown in FIG. 6 are output from a broadcast reception portion similar to that of the first aspect.

The operation portion 9 shown in FIG. 6 comprises an operation switch or similar provided on the device unit, and outputs to the driving pulse generation portion 2 a ratio modification signal in order to change the ratio of the image display interval to the black display interval such that the black display interval becomes the value set by a user operating the operation switch. For example, the operation portion 9 may be configured such that an OSD (onscreen display) display portion (not shown) is controlled to display in bar form the black display interval on the liquid crystal panel 5, and an operation switch is operated by the user to set the length of the bar, and by this means set the black display interval. The configuration of the operation portion 9 is not limited in particular to the above example, but may be modified variously; for example, a remote controller or similar may be comprised, and infrared rays or other wireless means employed to transmit ratio modification signals to the driving pulse generation portion.

The driving pulse generation portion 2 outputs to the gate driver 4 a gate driver control signal to drive the gate driver 4, as a timing system to change the write timing of the image signal and black display signal in one field interval such that the ratio of the image display interval to the black display interval is as specified by the ratio modification signal output from the operation portion 9, using as reference the synchronization signal output from the broadcast reception portion, and in addition outputs a source driver control signal to the source driver 3 to control the source driver 3. The source driver 3, gate driver 4 and similar operate similarly to the operation of the first aspect, and the prescribed image is displayed with the black display interval set by the user.

In this aspect, the signal conversion portion 1 is equivalent to an example of the conversion means; the driving pulse generation portion 2 is equivalent to an example of the generation means and generation means for the user; the source driver 3, gate driver 4 and liquid crystal panel 5 are equivalent to one example of the display means; and the operation portion 9 is equivalent to one example of the operation means.

Thus in this aspect, a ratio modification signal is output to change the ratio of the image display interval to the black display interval according to a user operation, and a gate driver control signal is generated to change the write timing of the frequency-doubled image signal and the frequency-doubled black display signal in one field interval, according to this ratio modification signal. Hence the write timing of the frequency-doubled image signal and frequency-doubled black display signal is changed according to the generated gate driver control signal, and video is displayed at the ratio of the image display interval to the black display interval corresponding to this write timing. As a result, the black display interval can be set according to the user operation, so that edge blur can be improved in response to user desires, and the reduction in brightness can be suppressed to the minimum necessary amount.

Figure 7:
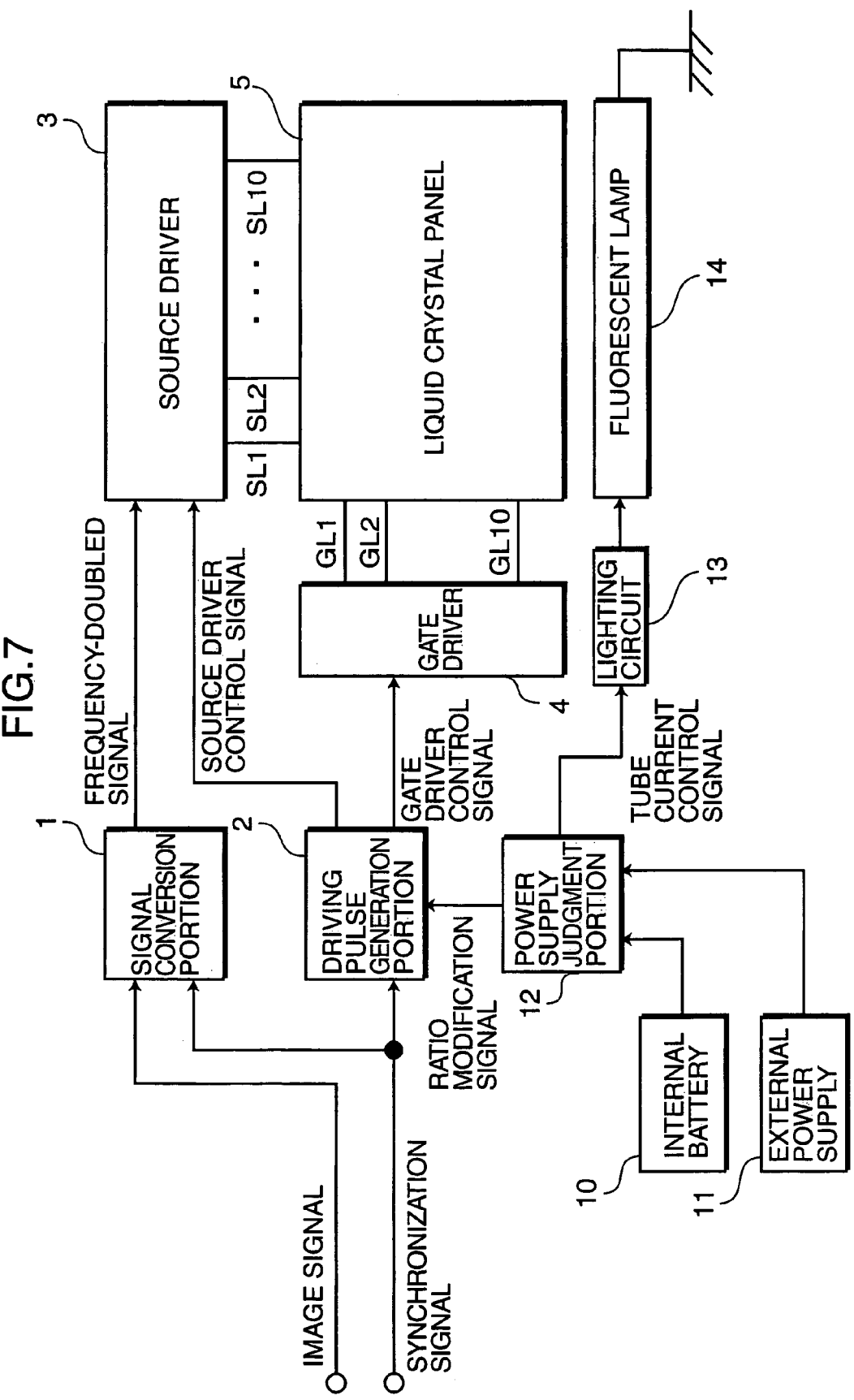
FIG. 7 is a block diagram showing the configuration of the display device of a third aspect of the invention.
Figure 8:
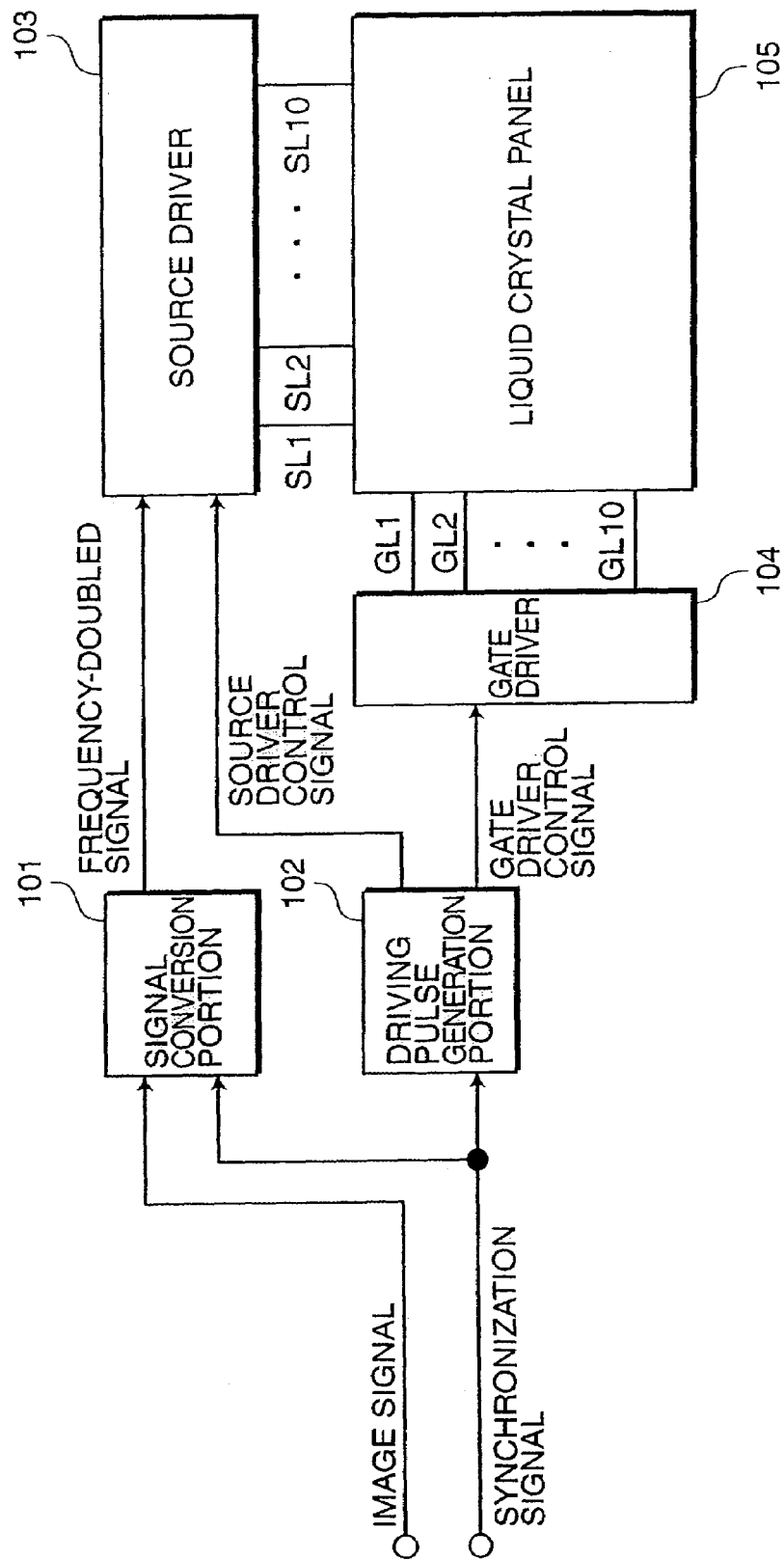
FIG. 8 is a block diagram showing the configuration of a conventional liquid crystal display device; and, FIG. 9 is a drawing showing the change with time in the pixel brightness in the conventional liquid crystal display device shown in FIG. 8.
Figure 9:
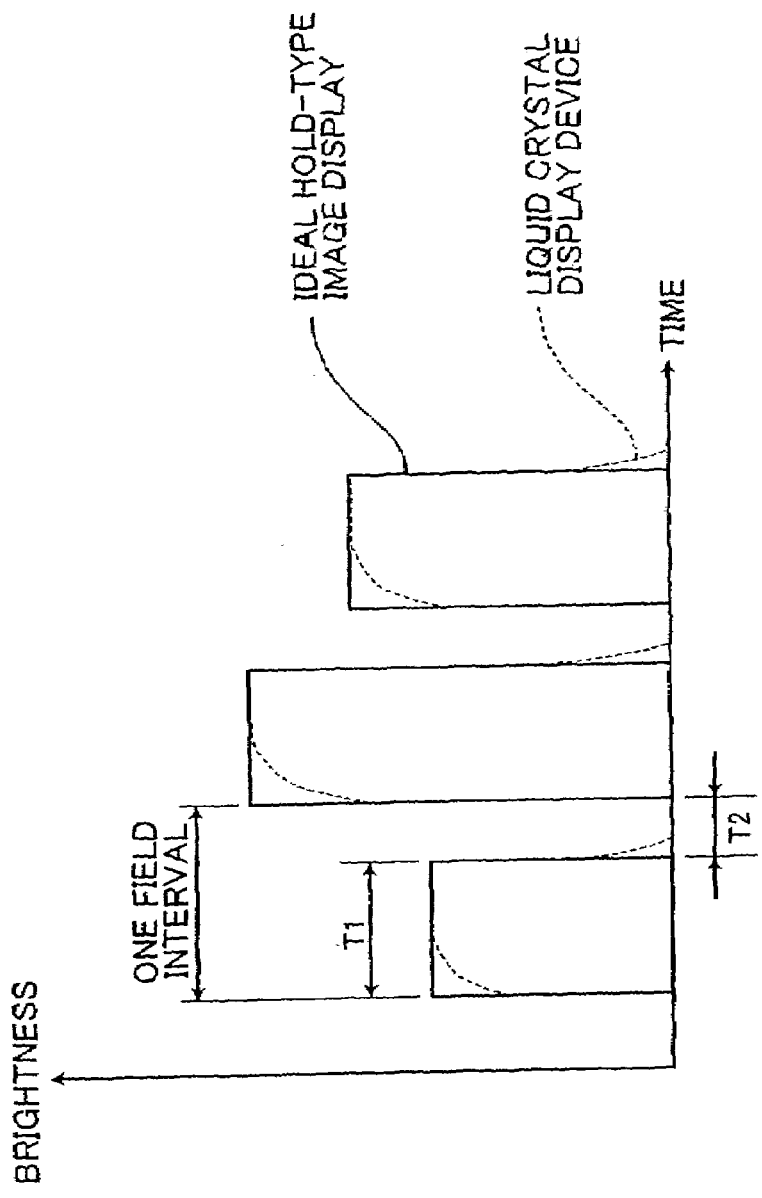

Next, the display device of a third aspect of this invention is explained. FIG. 7 is a block diagram showing the configuration of the display device of the third aspect of the invention. A difference between the display device of FIG. 7 and the display device of FIG. 1 is the addition of an internal battery 10, power supply judgment portion 12, and lighting circuit 13 in place of the EPG extraction portion 7 and program type decision portion 8; in other respects the display device is similar to the display device of FIG. 1, and so the same symbols are assigned to the same portions, and detailed explanations are omitted. In FIG. 7, the broadcast reception portion is omitted, but the image signal and synchronization signal shown in FIG. 7 are output from a broadcast reception portion similar to that of the first aspect; also, a normal lighting circuit, 13, external power supply 11 and fluorescent lamp 14 are also comprised by the first and second aspects, but are omitted from FIG. 1 and FIG. 6.

The internal battery 10 shown in FIG. 7 is configured to be detachably attached to the device unit, and comprises either a rechargeable battery or a dry-cell battery; when power is not supplied to the device unit from the external power supply 11, the internal battery 10 supplies power to the device unit. The external power supply 11 converts the AC voltage supplied from a commercial power supply into a DC voltage to supply power to the device unit; when power is being supplied from a commercial power supply, that is, from the external power supply 11, the liquid crystal display device shown in FIG. 7 preferentially uses power from the external power supply 11.

The power supply judgment portion 12 judges the state of supply of power by the external power supply 11, and outputs to the driving pulse generation portion 2 a ratio modification signal to change the ratio of the image display interval to the black display interval, according to the judgment result. Specifically, when the power supply judgment portion 12 judges that power is being supplied from the external power supply 11, a ratio modification signal is output so as to lengthen the black display interval, and when the power supply judgment portion 12 judges that power is not being supplied from the external power supply 11, but that power is being supplied from the internal battery 10, a ratio modification signal is output so as to shorten the black display interval.

The driving pulse generation portion 2 outputs to the gate driver 4 a gate driver control signal to drive the gate driver 4, as a timing signal to change the write timing of the high-frequency image signal and black display signal in one field interval such that the ratio of the image display interval to the black display interval becomes the ratio specified by the ratio modification signal output from the power supply decision portion 12, using as reference the synchronization signal output from the broadcast reception portion, and also outputs to the source driver 3 a source driver control signal to drive the source driver 3. The source driver 3, gate driver 4 and similar operate similarly to the first aspect, and the prescribed image is displayed with a black display interval appropriate to the state of supply of power by the external power supply 11.

The power supply decision portion 12 outputs a tube current control signal to the lighting circuit 13 to change the tube current of the fluorescent lamp 14, as a brightness control signal to set the brightness of the fluorescent lamp 14 according to the result of judgment of the state of the supply of power by the external power supply 11. Specifically, when the power supply judgment portion 12 judges that power is being supplied from the external power supply 11, a tube current control signal is output to increase the tube current of the fluorescent lamp 14 and increase the brightness, and when power is not being supplied from the external power supply 11, but power is being supplied from the internal battery 10, a tube current control signal is output to reduce the tube current of the fluorescent lamp 14 and suppress consumption of the internal battery 10.

The lighting circuit 13 lights the fluorescent lamp 14 such that the tube current specified by the tube current control signal flows. Specifically, when power is being supplied from the external power supply 11, the lighting circuit 13 increases the tube current of the fluorescent lamp 14 to increase the brightness according to the tube current control signal which causes an increase of the tube current of the fluorescent lamp 14, and when power is not being supplied from the external power supply 11 but power is being supplied from the internal battery 10, the lighting circuit 13 reduces the tube current of the fluorescent lamp 14 according to the tube current control signal which causes the tube current of the fluorescent lamp 14 to be reduced, to suppress consumption of the internal battery 10.

In this aspect, the signal conversion portion 1 is equivalent to one example of conversion means; the driving pulse generation portion 2 is equivalent to one example of generation means and generation means for power; the source driver 3, gate driver 4 and liquid crystal panel 5 are equivalent to one example of display means; the external power supply 11 is equivalent to one example of power supply means; the internal battery 10 is equivalent to one example of an internal battery; the power supply decision portion 12 is equivalent to one example of judgment means; the fluorescent lamp 14 is equivalent to one example of light-emitting means; and the lighting circuit 13 is equivalent to one example of brightness control means.

Thus in this aspect, the state of supply of power by the external power supply 11 is judged, a ratio modification signal is output to change the ratio of the image display interval to the black display interval according to the judgment result, and a gate driver control signal is generated to change the write timing of the frequency-doubled image signal and frequency-doubled black display signal in one field interval, according to the ratio modification signal. Hence the write timing of the frequency-doubled image signal and frequency-doubled black display signal is changed according to the gate driver control signal thus generated, and the video is displayed with the ratio of the image display interval to the black display interval corresponding to the write timing. Also, a tube current control signal is output to change the tube current of the fluorescent lamp 14 according to the result of judgment of the state of supply of power by the external power supply 11, and the tube current of the fluorescent lamp 14 is controlled according to this tube current control signal.

As a result, when power is being supplied from the external power supply 11, the black display interval can be lengthened and edge blur can be sufficiently improved, while in addition the tube current of the fluorescent lamp 14 can be increased to increase the brightness, so that satisfactory video can be displayed. And when power is being supplied from the internal battery 10, the black display interval can be shortened or eliminated and the brightness increased so that satisfactory video can be displayed, and in addition the tube current of the fluorescent lamp 14 can be decreased to suppress consumption of the internal battery 10.

The ratios of the image display interval to the black display interval used in this invention are not limited in particular to the examples described above, but can be changed variously according to the video displayed. Further, the method of insertion of the black display interval is not limited in particular to the above-described example, and various black insertion driving methods can be used. Also, this invention can be applied to various hold-type display devices; for example, the invention can be suitably applied to stationary large-size liquid crystal display devices for television use, to PDAs (portable information terminals) using small-size liquid crystal panels, and to portable liquid crystal display devices and similar. Further, the interval within which the ratio of the image display interval to the black display interval is changed is not limited in particular to the above-described single field interval (single frame interval), but can be changed variously; for example, the ratio of the image display interval to the black display interval can be changed for each gate pulse, or a single field interval can be divided into prescribed intervals, within each of which the ratio of the image display interval to the black display interval is changed, or the ratio of the image display interval to the black display interval can be changed in the first half and in the second half of a gate pulse.

INDUSTRIAL APPLICABILITY

As described above, by means of this invention, the ratio of the image display interval to the black display interval when displaying an image can be changed, so that when displaying images with large amounts of motion the black display interval can be lengthened and edge blur reduced sufficiently, whereas when displaying images with small amounts of motion the black display interval can be shortened and sufficient brightness secured, so that edge blur can be improved while suppressing the reduction in brightness.

The invention claimed is:

1. A hold-type display device, which continues display of an image for a prescribed display interval, comprising:
   a conversion unit operable to convert an input image signal into a high-frequency signal including: a high-frequency image signal obtained by increasing the frequency of the image signal; and a black display signal for the display of black;
   a generation unit operable to generate a timing signal to change a write timing in a prescribed interval of the high-frequency image signal and the black display signal, in order to modify a ratio, within the prescribed interval, of: an interval for image display by said high-frequency image signal; to an interval for black display by said black display signal;
   a display unit operable to modify the write timing of the high-frequency image signal and black display signal of the high-frequency signal converted by said conversion unit according to the timing signal generated by said generation unit, and to display the image;
   a reception unit operable to receive television broadcast signals including electronic program guide information;
   an extraction unit operable to extract electronic program guide information from the television broadcast signal received by said reception unit; and
   a decision unit operable to decide the type of broadcast program based on the electronic program guide information extracted by said extraction unit and to output a ratio modification signal to change the ratio of the image display interval by said high-frequency image signal to the black display interval by said black display signal, according to the broadcast program type decision; and wherein
   said generation unit includes a generation unit for programs operable to generate said timing signal according to the ratio modification signal output from said decision unit.

2. The display device according to claim 1, wherein said decision unit, on deciding that the type of said broadcast program is a first type, outputs to said generation unit for programs a first ratio modification signal to set said black display interval to a first black display interval, and on deciding that the type of said broadcast program is a second type in which images are mainly displayed with motion amounts smaller than for said first type, outputs to said generation unit for programs a second ratio modification signal to set said black display interval to a second black display interval shorter than said first black display interval; and,
   when said first ratio modification signal is input, said generation unit for programs generates a first timing signal which sets said black display interval to said first black display interval according to said first ratio modification signal, and when said second ratio modification signal is input, said generation unit for programs generates a second timing signal which sets said black display interval to said second black display interval according to said second ratio modification signal.

3. The display device according to claim 1, wherein said conversion unit converts said image signal into a frequency-doubled signal, including a frequency-doubled image signal with doubled frequency and a frequency-doubled black display signal for black display.

4. The display device according to claim 1, wherein said display unit includes a liquid crystal panel having a plurality of source lines to which are supplied pixel signals, a plurality of gate lines to which are supplied scan signals, and a plurality of pixel cells positioned in matrix form at the intersections of said source lines and said gate lines.

5. The display device according to claim 4, wherein said pixel cells are OCB cells.

6. A hold-type display device, which continues display of an image for a prescribed display interval, comprising:
   a conversion unit operable to convert an input image signal into a high-frequency signal including: a high-frequency image signal obtained by increasing the frequency of the image signal; and a black display signal for the display of black;
   a generation unit operable to generate a timing signal to change a write timing in a prescribed interval of the high-frequency image signal and the black display signal, in order to modify a ratio, within the prescribed interval, of: an interval for image display by said high-frequency image signal; to an interval for black display by said black display signal;
   a display unit operable to modify the write timing of the high-frequency image signal and black display signal of the high-frequency signal converted by said conversion unit according to the timing signal generated by said generation unit, and to display the image;
   a power supply unit operable to supply electrical power supplied from outside to the display unit,
   an internal battery detachably attached to the display unit for supplying power to the display unit when power is not being supplied to the display unit by said power supply unit, and
   ajudgment unit operable to judge the state of supply of power by said power supply unit and to output a ratio modification signal to change the ratio of the image display interval by said high-frequency image signal to the black display interval by said black display signal; and
   wherein said generation unit includes a generation unit for power operable to generate said timing signal according to the ratio modification signal output from said judgment unit.

7. The display device according to claim 6, wherein:
   said display unit further includes a light-emitting unit operable to emit light for display, and a brightness control unit operable to control the brightness of said light-emitting unit;
   said judgment unit, upon judging that power is being supplied from said power supply unit, outputs to said generation unit for power a first ratio modification signal to set said black display interval to a first black display interval, and outputs to said brightness control unit a first brightness control signal to set the brightness of said light-emitting unit to a first brightness level, and, upon judging that power is being supplied from said internal battery, outputs to said generation unit for power a second ratio modification signal to set said black display interval to a second black display interval shorter than said first black display interval, and outputs to said brightness control unit a second brightness control signal to set the brightness of said light-emitting unit to a second brightness level lower than said first brightness level;
   said generation unit for power, when said first ratio modification signal is input, generates a first timing signal which sets said black display interval to said first black display interval in response to said first ratio modification signal, and when said second ratio modification signal is input, generates a second timing signal which sets said black display interval to said second black display interval in response to said second ratio modification signal; and, said brightness control unit, when said first brightness control signal is input, sets the brightness of said light-emitting unit to said first brightness level in response to said first brightness control signal, and when said second brightness control signal is input, sets the brightness of said light-emitting unit to said second brightness level in response to said second brightness control signal.

8. The display device according to claim 6, wherein said conversion unit converts said image signal into a frequency-doubled signal, including a frequency-doubled image signal with doubled frequency and a frequency-doubled black display signal for black display.

9. The display device according to claim 6, wherein said display unit includes a liquid crystal panel having a plurality of source lines to which are supplied pixel signals, a plurality of gate lines to which are supplied scan signals, and a plurality of pixel cells positioned in matrix form at the intersections of said source lines and said gate lines.

10. The display device according to claim 9, wherein said pixel cells are OCB cells.

11. A display device driving method, for use with a hold-type display device which continues display of an image for a prescribed display interval, said method comprising:

converting an input image signal into a high-frequency signal including: a high-frequency image signal obtained by increasing the frequency of the image signal; and a black display signal for the display of black;

generating a timing signal to change a write timing in a prescribed interval of the high-frequency image signal and the black display signal, in order to modify a ratio, within the prescribed interval, of: an interval for image display by said high-frequency image signal; to an interval for black display by said black display signal;

modifying the write timing of the high-frequency image signal and black display signal of the high-frequency signal according to said timing signal, and displaying the image;

receiving television broadcast signals including electronic program guide information;

extracting electronic program guide information from the received television broadcast signal; and determining the type of broadcast program based on the extracted electronic program guide information and outputting a ratio modification signal to change the ratio of the image display interval by said high-frequency image signal to the black display interval by said black display signal, according to the broadcast program type decision; and wherein in said generating of said timing signal, said timing signal is generated according to the ratio modification signal.

12. A display device driving method, for use with a hold-type display device, which includes an internal battery and which continues display of an image for a prescribed display interval, said method comprising:

converting an input image signal into a high-frequency signal including: a high-frequency image signal obtained by increasing the frequency of the image signal; and a black display signal for the display of black;

generating a timing signal to change a write timing in a prescribed interval of the high-frequency image signal and the black display signal, in order to modify a ratio, within the prescribed interval, of: an interval for image display by said high-frequency image signal; to an interval for black display by said black display signal;

modifying the write timing of the high-frequency image signal and black display signal of the high-frequency signal according to said timing signal, and displaying the image;

supplying electrical power to the display device from a power source outside the display device;

supplying power to the display device from the internal battery when power is not being supplied to the display device from outside; and judging the state of supply of power and outputting a ratio modification signal to change the ratio of the image display interval by said high-frequency image signal to the black display interval by said black display signal; and wherein in said generating of said timing signal, said timing signal is generated according to the ratio modification signal.

* * * * *